United States Patent [19]

Eggebeen

[11] Patent Number: 4,975,791
[45] Date of Patent: Dec. 4, 1990

[54] RECORDING SYSTEM HAVING HEAD TRANSDUCERS WITH CONTROLLED SKEW

[75] Inventor: James A. Eggebeen, San Diego, Calif.
[73] Assignee: Carlisle Memory Products Group Incorporated, North Richland Hills, Tex.
[21] Appl. No.: 171,755
[22] Filed: Mar. 22, 1988
[51] Int. Cl.$^5$ .................... G11B 5/58; G11B 21/10
[52] U.S. Cl. .................... 360/77.01; 360/21; 360/77.11; 360/77.12
[58] Field of Search ............ 360/18, 20, 21, 27, 28, 51, 76, 77.01, 77.02, 77.05, 77.07, 77.08, 77.11–77.16, 131, 135

[56] References Cited

U.S. PATENT DOCUMENTS

| | | | |
|---|---|---|---|
| 2,712,572 | 7/1955 | Roberts | 360/21 |
| 3,164,682 | 1/1965 | Anderson . | |
| 3,219,353 | 11/1965 | Prentky | 360/131 |
| 3,328,195 | 6/1967 | May | 360/131 |
| 3,402,463 | 9/1968 | Bos et al. . | |
| 3,404,392 | 10/1968 | Sordello | 360/77.07 |
| 3,512,253 | 5/1970 | Perkins et al. . | |
| 3,665,118 | 5/1972 | Cooper, Jr. . | |
| 3,692,255 | 9/1972 | Von Behren . | |
| 3,718,776 | 2/1973 | Bate et al. . | |
| 3,790,754 | 2/1974 | Black et al. . | |
| 3,813,693 | 5/1974 | Gooch et al. . | |
| 3,861,619 | 1/1975 | Wolff . | |
| 3,956,769 | 5/1976 | Beecroft et al. | 360/131 |
| 3,986,205 | 10/1976 | Fayling . | |
| 4,075,384 | 2/1978 | Suzuki et al. . | |
| 4,110,799 | 8/1978 | Bergmans et al. . | |
| 4,149,198 | 4/1979 | Behr et al. | 360/76 |
| 4,158,213 | 6/1979 | Griffith . | |
| 4,221,348 | 9/1980 | Moeller . | |
| 4,237,189 | 12/1980 | Deffeyes . | |
| 4,291,354 | 9/1981 | Chase . | |
| 4,313,140 | 1/1982 | Keidl | 360/131 |
| 4,314,289 | 2/1982 | Haynes | 360/77.01 |
| 4,318,141 | 3/1982 | Haynes | 360/131 |
| 4,334,252 | 6/1982 | Toriu . | |
| 4,347,534 | 8/1982 | Kimura | 360/21 |
| 4,390,911 | 6/1983 | Klaassen | 360/18 |
| 4,393,427 | 7/1983 | Sakurai . | |
| 4,419,700 | 12/1983 | Ragle et al. | 360/77.02 |
| 4,439,699 | 3/1984 | Brende et al. . | |
| 4,456,934 | 6/1984 | Wedman et al. . | |
| 4,466,564 | 8/1984 | Smith et al. . | |
| 4,523,727 | 6/1985 | Morioka . | |
| 4,534,523 | 8/1985 | Zarr . | |
| 4,539,615 | 9/1985 | Arai et al. | 360/76 |
| 4,571,789 | 2/1986 | Morioka . | |
| 4,581,663 | 4/1986 | Tanaka | 360/77.01 |
| 4,609,959 | 9/1986 | Rudi . | |
| 4,620,253 | 10/1986 | Garwin et al. . | |

OTHER PUBLICATIONS

IMB TDB, vol. 16, No. 6, "Servo Disk with Overlapping Servo and Data Tracks", Comstock et al., 11/73, p. 1818.

Primary Examiner—Aristotelis M. Psitos
Assistant Examiner—Steven R. Garland
Attorney, Agent, or Firm—Samuels, Gauthier & Stevens

[57] ABSTRACT

A magnetic recording system including a write head comprising a write transducer having a gap configured at an angular orientation with respect to direction of travel of an adjacent magnetic medium. Servo information is recorded by the write head into a servo, or higher coercivity, layer of the magnetic medium in a plurality of parallel, adjacent tracks and at an angle corresponding to the angular orientation of the write transducer. The servo information is at one of two frequencies, with adjacent tracks being at different frequencies with respect to each other. A read head includes a first transducer configured at an orientation corresponding to the angular orientation of the servo information. The first transducer and its related circuitry detect information from the parallel servo tracks, and generate an error signal indicating actual position of the second transducer as compared to its desired position with respect to the servo tracks. The error signal is used by a control circuit for positioning the first transducer. A second transducer is configured in tandem alignment to the first transducer, but is oriented at an angle sufficiently different from that of the first transducer so that the second transducer detects substantially none of the servo information. The second transducer reads and writes data in a data, or lower coercivity, layer of the magnetic medium. Circuitry is provided which uses the servo information for synchronization to achieve accurate reading and writing of data at a high level of lineal density in the magnetic medium.

38 Claims, 3 Drawing Sheets

RECORDING SYSTEM HAVING HEAD TRANSDUCERS WITH CONTROLLED SKEW

BACKGROUND OF THE INVENTION

1. Field of the Invention.

The present invention relates to magnetic recording systems, and in particular to a recording system and method which utilizes buried servos for achieving high track densities, accurate track following operation, and constant linear density in spite of speed variations of the magnetic recording medium.

2. The Prior Art.

It has long been an objective in the magnetic recording technology to provide a system that permits recording of information on a magnetic medium in high track densities, and with high lineal densities One way by which the track density may be improved is to provide a system and a method for accurately following the tracks Higher lineal densities may be achieved by reducing the amount of control information needed to be stored in the information storage area of the magnetic medium.

One technique for providing higher track and lineal densities involves the use of a servo signal, i.e., a track-location indicating signal, which is superposed with a data signal, in the magnetic medium This technique is utilized in the system disclosed in U.S. Pat. No. 3,404,392 to Sordello. The Sordello patent teaches use of a dual layer magnetic coating on a disk substrate. A lower layer has a higher retentivity and coercivity than an upper layer. A servo signal is first recorded in the lower layer for indicating track position Following such recording, data signals are recorded in the upper layer Then both the servo and data signals are sensed. This dual layer configuration allows the servo signals to remain undisturbed by subsequent writing and rewriting of data signals in the upper layer. There are no recording operations disclosed which are based upon sensing the servo signals.

For each data recording operation in the Sordello reference, an erase gap precedes a read/write gap so that the data signal can be successfully recorded in the upper layer. During read-back, not only is the data signal read back by a single gap, but two sets of servo signals also are simultaneously read back Sordello utilizes linearly recorded sine waves that are written in concentric circular tracks, with adjacent servo tracks being written at different frequencies. Each data track is superposed over ½ of an odd numbered servo track, and over ½ of an even numbered servo track The data signals are recorded at a high frequency, which is at least three or four times the frequency of the servo signals in the lower layer, thereby enabling the data signals to be separated from the servo signals by filtering. The Sordello recorder uses a single gap or transducer for simultaneously reading the control or servo signals along with the data signals. The filtered servo signals are used to accomplish alignment of the Sordello transducer on the tracks of the magnetic medium.

Subsequent developments have attempted to improve on the Sordello system by providing structure such as first and second transducers, which are arranged in the longitudinal direction of a record track One of the transducers is used for reading or writing data onto the magnetic medium The other transducer is used for reading the servo control signal, which is prerecorded in the high coercivity portion of the magnetic medium The information from the transducers is passed to a filtering system for, in one case, identifying the position control signals in order to appropriately position the transducers in the tracks. In another case, the filtering accomplishes separation of the information stored on the magnetic medium from the servo control signals, so that the information or data may be retrieved and passed to output devices, or used for other purposes.

Systems such as those described above have resulted in an increase in track density recording However, these systems continue to be unduly cumbersome since they require additional circuitry for separating and segregating the data signals from the servo signals, which separation and segregation is necessary for substantially any practical utilization of the system. In addition, these systems include a clocking system that typically requires an extensive amount of clocking data to be included in the data layer of the magnetic medium, in order to synchronize the reading operation with the speed of the magnetic medium as it passes adjacent the transducers of the system. Clocking schemes requiring large percentages of the data-layer storage space for this clocking data continue to be used in current systems.

As is apparent from the above discussion, what is needed in the art is a system and method for recording data signals in a magnetic medium that provides accurate track alignment in order to permit high track density, and that also provides for a minimum amount of clocking information to be stored within the data signal, so as to permit accurate, high level, lineal data storage density. It would be a further improvement in the art to provide such a system that provides improved linear recording accuracy by accurately eliminating the effects of media speed variations on linear recording density. A still further improvement in the art would be to provide a system and method whereby the servo control signals and the data signals could be retrieved from the magnetic medium independently of one another and without the use of filtering arrangements for accomplishing this purpose. Such a system and method is described and claimed herein.

BRIEF SUMMARY AND OBJECTS OF THE INVENTION

The present invention comprises a novel system and method for providing high record track densities on a magnetic medium while minimizing the complexity and operational requirements of magnetic medium path guidance control systems, as well as minimizing the effects of speed variations in the magnetic medium due to factors such as motor fluctuation, tape non-rigidity, and lack of speed control.

The system uses a magnetic recording medium such as a magnetic tape having a substrate or base film upon which are secured two layers of magnetic material, comprising the magnetic medium. The layer of magnetic material closest to the base film is of a higher coercivity than the layer which is further from the base film. Servo information is placed into the higher coercivity layer, referred to as the "servo layer," while data is placed into the lower coercivity or "data layer." The servo information is recorded in the servo layer in such a manner as to provide parallel adjacent tracks of servo information. The frequencies of the servo information alternate between adjacent tracks, so that a first track has a higher frequency servo information signal, while the servo tracks on either side of the first track contain lower frequency servo information. Accordingly, the servo tracks alternately contain higher and lower frequency servo information.

Servo information is recorded in tracks in the servo layer through use of a write head comprising a write transducer having a write gap that is configured at an angular orientation with respect to the direction of travel of the magnetic medium past the write transducer. The servo information is thereby placed in the servo layer tracks in a skewed configuration, corresponding to the angular orientation of the write transducer.

A read head is provided, having a first transducer that is configured in a skewed or angular orientation corresponding to the skew of the servo information in the servo layer. This first transducer is positioned over the boundary between parallel, adjacent tracks of servo information, and functions to detect information from those parallel tracks as the magnetic medium passes adjacent the transducer. A filter circuit is connected directly to the read head to differentiate between the high and low frequency servo information. As detected by the first transducer, the amplitude of the high frequency information recorded on one track is compared against the amplitude of the adjacently recorded low frequency information, and an error signal is produced as a result of this comparison. The error signal is used by a control circuit to position the first transducer at a "central" position, directly over the boundary between the two adjacent servo tracks.

A second transducer is provided and positioned on another head or, optionally, on the first head with the first transducer. The second transducer is configured in tandem alignment to the first transducer with respect to the servo tracks, but is skewed in an orientation that is sufficiently different from the skew of the first transducer so that the second transducer detects substantially none of the servo information when in the read mode.

The second transducer functions either as a read or write transducer for placing data into the upper data layer of the low coercivity magnetic medium. Because of its skewed orientation, the second transducer may read or write the data in the data layer without detection of or interference with the servo information. Likewise, because of the skewed orientation of the first transducer, it reads the servo information from the servo layer with substantially no interference from the data in the data layer. As a result, filtering is not required to retrieve or segregate servo information from data, or vice versa. This allows each data track to be utilized more completely for storing data, while still utilizing the servo information in the servo layer for accurately positioning the first and second transducers laterally on the magnetic medium in order to define high density data track configurations.

The servo information is also used for achieving accurate writing and reading of data that is recorded at a high level of lineal density in the magnetic medium In order to achieve this, the high frequency component of the servo information is filtered out, and the lower frequency is then phase locked to a frequency multiplier which runs at the primary data rate for the data layer This frequency multiplier is used as a data clock to write the data onto the magnetic medium, as well as to establish the center of the bit cell transition region for the returning data signal. A synchronization character that is provided prior to the beginning of each data block is used to synchronize the servo and data information.

Once the synchronization character is past, the data tracking phase locked loop is locked, the phase is synchronized to the servo information, and all clock recovery and writing operations are then done in synchronism to this clock Accordingly, this technique permits use of a non-self clocking code for generating a higher bit per inch efficiency and with a flux transition density that is not generally possible through use of a self-clocking code on a magnetic medium such as a tape.

These and other advantages and features of the present invention will become more fully apparent from the following description and appended claims taken in conjunction with the accompanying drawings.

DETAILED DESCRIPTION OF THE PREFERRED EMBODIMENT

The invention is best understood by reference to the figures wherein like parts are designated with like numerals throughout.

Figure 1:
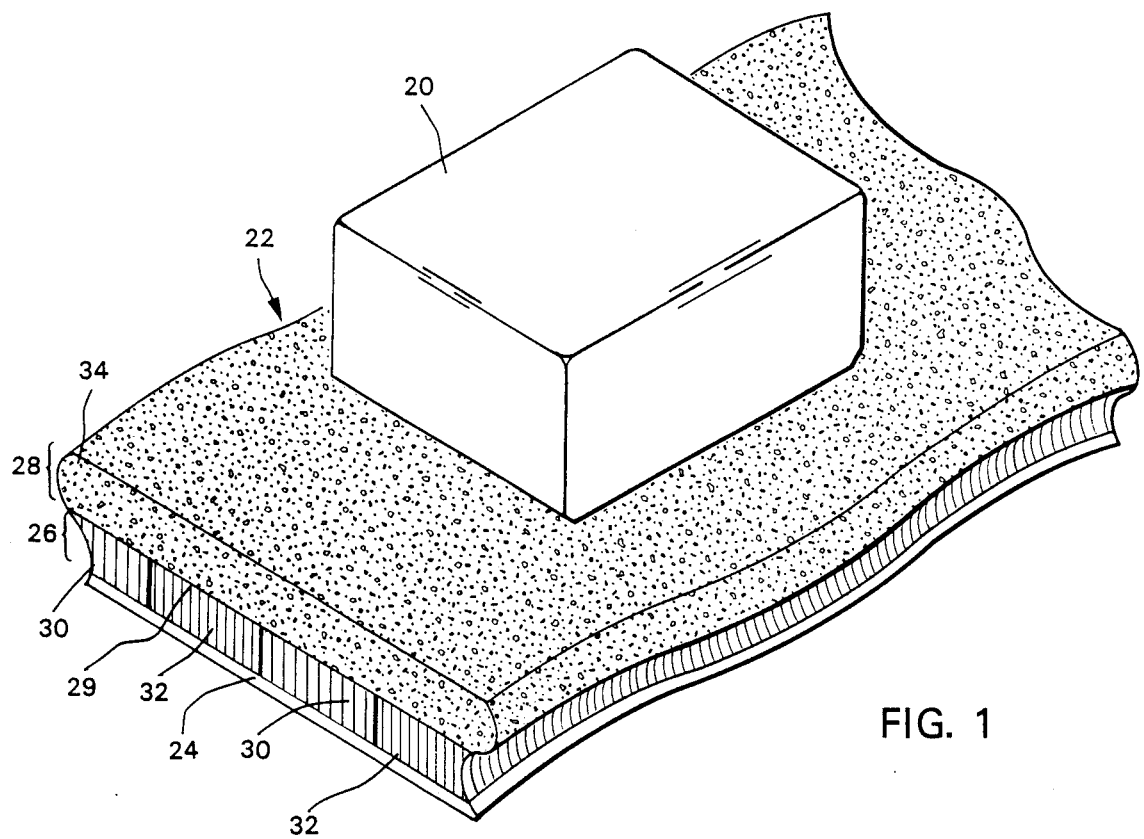
FIG. 1 is a perspective view of one presently preferred embodiment of a system comprising the invention, including a housing which includes the servo transducer and the data transducer, positioned adjacent a bimodal magnetic medium and prior to recording data on the magnetic medium.

One presently preferred embodiment of the magnetic recording system of the present invention is illustrated in FIG. 1. In particular, the system of FIG. 1 includes a housing 20, which is preferably comprised of a material such as brass or ceramic and configured in the form of a block having an interior cavity for securing magnetic cores or transducers (not shown).

To accomplish its purpose, the housing 20 is placed adjacent a magnetic medium 22 such as a magnetic tape, so that the transducers in the housing are positioned in proximity to the magnetic medium 22. As the magnetic medium passes adjacent the housing 20, data is read or written on the magnetic medium by the transducers.

In the preferred embodiment of the present invention, the magnetic medium 22 is bimodal in construction, comprising at least two different magnetic layers having different coercivities, with the preferable configuration being in the form of a magnetic tape. Such magnetic media, along with their method of manufacture are disclosed in U.S. Pat. No. 4,237,189 to Deffeyes entitled "Polymodal Magnetic Recording Medium Process for Making and Verifying the Same and Compositions Useful Therein;" and in U.S. Pat. No. 4,281,043 to Deffeyes entitled "Polymodal Magnetic Recording Medium and Compositions Useful Therein." Both of these Deffeyes references are hereby incorporated herein by reference.

A cross-sectional view of the magnetic medium 22 is presented in FIG. 1, illustrating the physical construction of the magnetic medium, as well as a schematic representation of the servo information that is placed within that medium. Specifically, the medium 22 comprises a substrate 24 such as a polyethylene terephthalate for providing structural support to the other components of the magnetic medium Upon the substrate 24 is a layer of high coercivity material referred to herein as the servo layer 26. Upon the servo layer 26 is positioned a data layer 28 comprised of low coercivity material The differences in coercivity between the lower servo layer 26 and the upper data layer 28 should be such that the switching field distribution overlap is only about 5% on interface 29 between the two layers 26 and 28. The material comprising the servo layer 26 is lightly doped so as not to overcome the signal carrying characteristics of the data layer 28. Typical particle compositions for the data layer 28 are gamma ferric oxide, with the servo layer 26 being comprised of cobalt gamma ferric oxide On the other hand, if the data layer 28 is comprised of a cobalt gamma ferric oxide, then the servo layer 26 can conveniently comprise barium ferrite or one of the new generation of ultra-high coercivity magnetic particles.

In the servo layer 26, a plurality of parallel servo tracks are defined by servo information which has been placed in those tracks. More particularly, servo information at a first frequency is placed so as to define a plurality of separated, first frequency servo tracks 30, comprising every other track across the servo layer 26. Adjacent and between each of the first frequency servo tracks 30 are second frequency servo tracks 32, with the second frequency being different than the first frequency. In the illustrated embodiment, the first frequency servo tracks 30 are defined by servo information that is at a lower frequency than that of the second frequency servo tracks 32. Thus, servo layer 26 is comprised of a plurality of adjacent, parallel servo tracks with adjacent tracks defined such that one track contains higher frequency servo information, while the adjacent track contains lower frequency servo information. In one presently preferred embodiment, the low frequency servo tracks would define a density of about 2,500 flux transitions per inch (ftpi), while the higher frequency servo tracks would have a density of about 5,000 ftpi.

An apparatus and method for placing the multiple track servo information in the magnetic medium very accurately and efficiently is described in applicants' co-pending patent application Ser. No. 171,842 filed Mar. 22, 1988 entitled "Bimodal Multi-Track Magnetic Head," which application is filed concurrently herewith This co-pending patent application is hereby incorporated herein by reference.

Applicants' magnetic head and method for placing the multiple track servo information into the magnetic medium comprises use of a housing or mounting fixture upon which a full width write core is affixed in tandem with a multiple track write core. In one preferred embodiment, both of these cores are oriented at an angle, such as, for example, 45 degrees, normal to the direction of motion of the magnetic medium, so that a data head for subsequently reading and writing data on the magnetic medium can be oriented at a different angle, permitting detection of the data recorded on the magnetic medium without detection of the servo information as a result of this deliberate azimuthal misalignment.

In operation, the magnetic medium 22 first passes adjacent a full width write core of the magnetic head or housing. This full width write core is energized with a sinusoidal AC biased write current to fully saturate the magnetic medium with a linear sinusoidal waveform. Accordingly, once the magnetic medium has passed adjacent the full width write core, a servo pattern at a first frequency has been written across the width of the magnetic medium. The magnetic medium next passes adjacent the multiple track write core, which is also energized with an AC biased sinusoidal write current at a second frequency. The second frequency is different from the first frequency, and the write current is biased at a rate so as not to erase the information in the magnetic medium adjacent the outaway or non-writing sections of the multiple track core.

After the magnetic medium has passed in proximity to both of the write cores in the magnetic head, the magnetic medium contains a plurality of servo information tracks, such as those illustrated at 30 and 32.

Without further activity, the tracks 30 and 32 extend not only in the servo layer 26, but also continue upward through the data layer 28. Prior to recording data in the data layer 28, the tracks corresponding to 30 and 32 in layer 28 are erased by the application of an AC field, in order to randomize the magnetic polarization of the data layer. This erasing process creates a randomized polarization area across the entire data layer of the magnetic medium, as illustrated at 34 in FIG. 1. The use of an AC field for randomizing the magnetic polarization of the data layer 28 is a common technique used in magnetic recording in audio applications. Typically, such an AC field is used to erase a magnetic particle as the magnetic tape is moved underneath an AC field, which in effect generates a decaying alternating field effect of the particles. In this manner, the switching field distribution in conjunction with the decaying magnetization strength leaves an equivalent number of particles magnetized in each direction. It is noted that the AC bias frequency must be several times the data frequency so that the magnetic head applying the AC field cannot write the bias frequency into the magnetic medium with any resolution.

It is important that the servo information in the servo layer 26 not be changed as a result of any writing or changing of the particle magnetization state in the data layer 28 of the magnetic medium 22 Accordingly, the write head for the data layer 28 must produce a field strength at the interface 29 between the high coercivity servo layer 26 and the low coercivity data layer 28 such that the field will be sufficiently strong to switch the majority of the particles in the data layer 28, while being sufficiently low so as to not influence a significant portion of the particles in the servo layer 26. For purposes of example, one preferred embodiment of the present invention uses a 600 oersted coercivity for the servo layer 26, and a 300 oersted coercivity for the data layer 28. This requires a field which falls to approximately 400 to 500 oersteds at the interface 29. At that interface 29, in order to achieve proper saturation recording in the data layer 28, the field strength produced by the write head must be sufficient to overcome the switching field distribution of the 300 oersted particles, and yet not influence the immediately adjacent 600 oersted particles.

Figure 2:
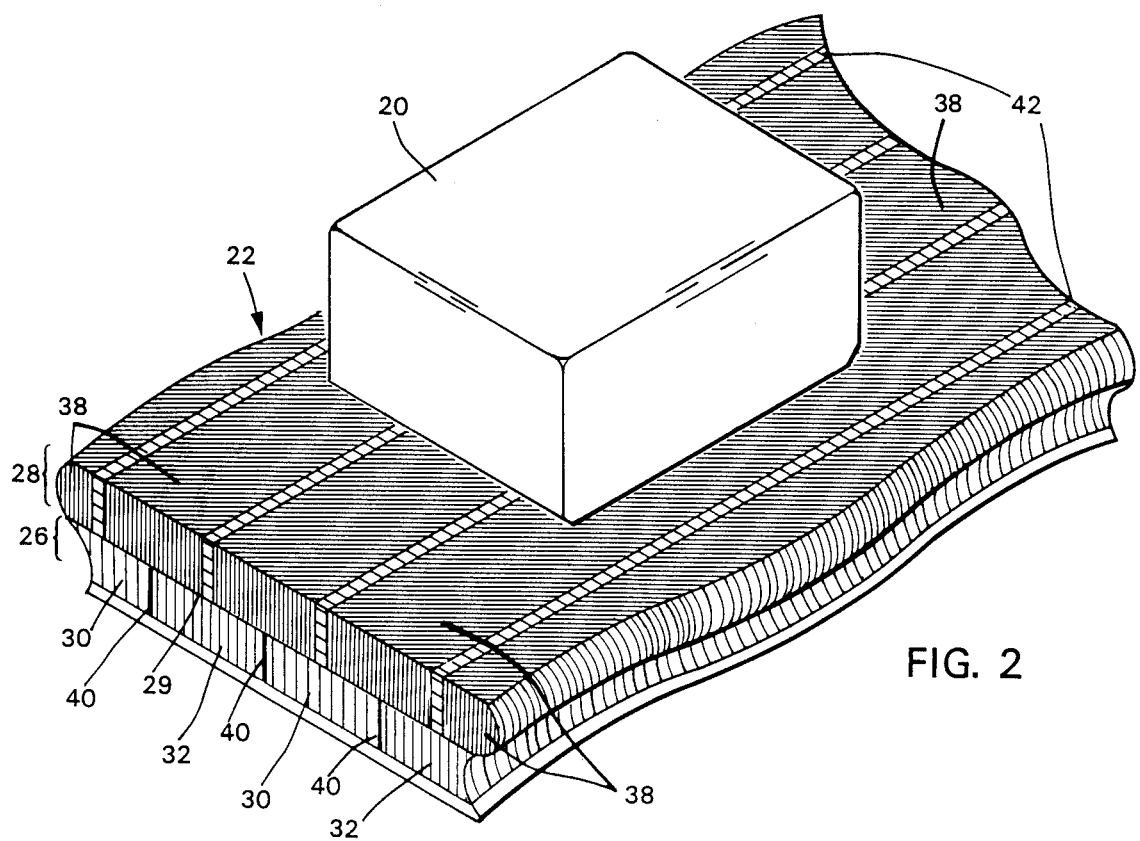
FIG. 2 .is a perspective view corresponding to the system of FIG. 1, illustrating the magnetic medium after data is recorded thereon.

With the information in the data layer randomized as described above, the bimodal read/write head of the present invention may be used to place data in a plurality of tracks in the data layer 28. FIG. 2 illustrates a cross-sectional perspective view of the magnetic medium, corresponding to the view of FIG. 1, but with data written into the data layer so as to define data tracks 38. It will be noted that each of the data tracks 38 are substantially centered directly over a boundary 40 between adjacent servo tracks 30 and 32, respectively The servo tracks 30 and 32 are used in a manner to be described hereafter to assist a read transducer (not shown) in the housing 20 to maintain accurate lateral position on the magnetic medium 22 in order to permit a write transducer (not shown) in the housing 20 to place data into the magnetic medium 22 in a manner which defines the data tracks 38.

Between each of the data tracks 38 is a guard band 42 comprising randomized particles corresponding to the particles in the randomized polarization area 34 of FIG. 1. These guard bands are narrow areas in which no data is written, and are provided to avoid overlap between adjacent data tracks 38, so that no degradation of the data in tracks 38 occurs due to interference with adjacent tracks.

A visual representation of the data and servo information stored in the magnetic medium 22 is presented in FIG. 3 It is well-known that the process of recording information digitally on magnetic tape is composed of generating cells or regions on the tape which are polarized magnetically parallel to the motion of tape direction. The boundary of two dissimilar polarized cells will generate an induced voltage as the polarized cells in the magnetic medium pass underneath the head. The induced voltage is generated by a closed flux link through the core and through the windings of the head. In digital recording, the flux transition boundaries are maintained as steep as possible so as to induce a voltage described by the equation $Nd\phi dt$ into the head. Where N is the number of turns of the coil; and $d\phi dt$ is the magnetic flux transitions per unit time.

It is, therefore, beneficial to make the flux transition as steep as possible to receive the maximum voltage. However, the information content in a digital recording is solely embodied in the transition boundary. The signals received, therefore, are differentiations of the square wave used to write the magnetic information into the magnetic medium. On the other hand, the servo information does not contain discrete transition boundaries as does the data. The servo signal comprises a more gradual changing of the polarity of the particles in the servo layer 26, in order to maintain the sinusoidal read voltage when the servo information passes under the magnetic head. The signals illustrated in FIG. 3 define zero crossings of the signals, and accordingly, relate to the flux transition boundaries.

Figures 3A, 3B, 3C, 3D, 4, 5:
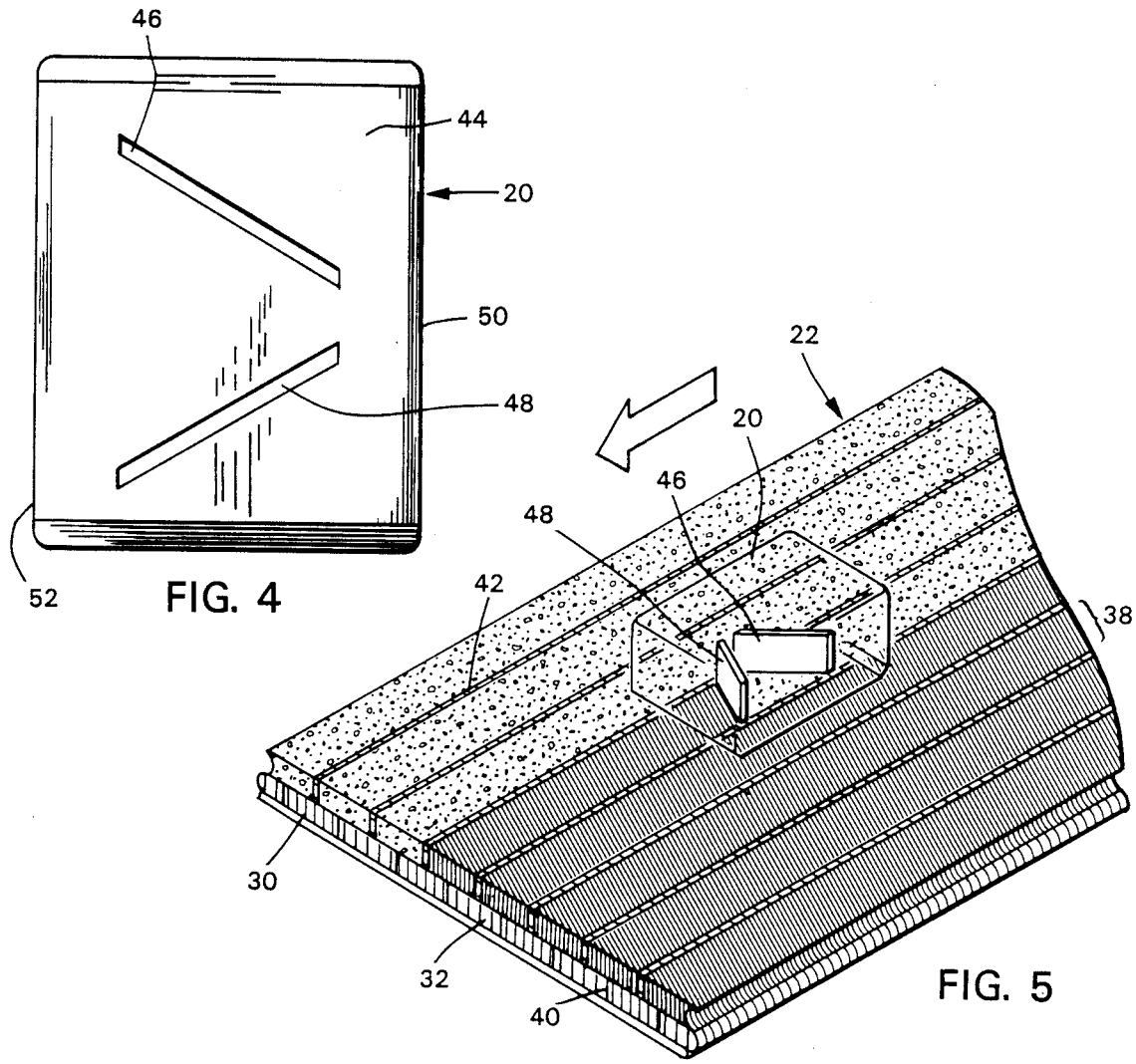
FIG. 3a is a graphical representation of a data signal stored in the data layer of the magnetic medium.
FIG. 3b is a graphical illustration of the higher frequency servo signal stored in the servo layer of the magnetic medium.
FIG. 3c is a graphical representation of the lower frequency servo signal stored in the servo layer of the magnetic medium.
FIG. 3d illustrates a waveform characterizing the zero cross detection signal for the high frequency servo information.
FIG. 4 comprises a bottom plan view of the housing, illustrating the servo and data transducers as configured in one preferred embodiment of the invention.
FIG. 5 is a perspective view of the system of FIG. 1, illustrating one preferred orientation of the transducers within the housing and with respect to the magnetic medium.

Specifically, FIG. 3a illustrates one embodiment of data which may be contained in the data layer 28. FIG. 3b illustrates the waveform of a higher frequency signal defining the first frequency servo tracks 30 FIG. 3c illustrates the waveform of a lower frequency information signal defining the second frequency servo tracks 32. In the recording process, it is important that the information in the servo tracks, such as that illustrated at FIGS. 3b and 3c, be recorded in a very sinusoidal configuration. If the signal were square or non-sinusoidal, the high frequency component of the signal would adversely affect the recovery of the servo signal as illustrated in FIG. 3a. The waveform of FIG. 3d illustrates the zero crossing transition point of the high frequency signal of FIG. 3b. In the presently preferred embodiment, this zero crossing waveform is used for purposes of synchronizing the servo information and the data, and also for synchronizing read operations as the magnetic medium passes adjacent transducer in the housing 20. Of course, the zero crossing of the lower frequency waveform illustrated in FIG. 3c could also be used for this purpose. Although it is desirable that the high and low frequencies illustrated in FIGS. 3b and 3c, respectively, be multiples or harmonics of one another, this is not required in order to accomplish the synchronization operations. One preferred apparatus and method for accomplishing the above-mentioned synchronization will be described hereafter.

One presently preferred embodiment of a read/write head configuration for use with the present invention may be described by reference to FIG. 4. Specifically, FIG. 4 comprises a bottom plan view of the housing 20, illustrating a magnetic medium contact face 44 which preferably defines a slightly curved configuration to accommodate the passage of a magnetic medium 22 in close proximity thereto Positioned in the face 44 so as to extend adjacent the magnetic medium 22 is a servo transducer 46 comprising a gap which is formed by a first core structure (not shown) secured in position within the housing 20. The servo transducer 46 comprises a read head of the type which is well-known in the technology This servo transducer is configured to detect servo information contained in the servo layer 26 of the magnetic medium 22.

Also secured in the housing 20 so as to be positioned on the contact face 44 in proximity to the magnetic medium 22 is a data transducer 48. The data transducer 48 comprises a gap which is formed by a second core structure (not shown) secured in position within the housing 20. The second core comprises a read/write head of the type which is well-known in the technology. In the preferred embodiment, the data transducer 48 reads data from the data layer of the magnetic medium 22. The data transducer also writes data into the data layer 28, at a field strength that is sufficiently strong to switch the majority of the particles in the data layer 28, while being sufficiently low so as not to influence any significant portion of the particles in the servo layer 26.

In the preferred embodiment, the servo transducer 46 and data transducer 48 are each oriented at angles with respect to the edges of the contact face 44, such that they define selected angular orientations with respect to the direction of travel of the magnetic medium 22 as it passes adjacent the two transducers 46 and 48. The angle of orientation of the servo transducer 46 is selected so that servo information previously written into the servo layer 26 of the magnetic medium 22 can be read by the servo transducer 46 with minimal interference from data in the data layer 28. Likewise, the angle of orientation of the data transducer 48 is selected so that data may be written into, or read from, the data layer 28 with minimal interference from the servo information in the servo layer 26.

The angular relationship of the two transducers 46 and 48 with respect to the parallel sides 50 and 52 of the housing 20 is illustrated in FIG. 4. Since the sides 50 and 52 are parallel to the boundaries of the tracks in the magnetic medium 22 as that magnetic medium travels adjacent to the housing 20, the illustrated angular orientation also defines the orientation of the servo information and data which is read and/or written in the magnetic medium 22 by the two transducers 46 and 48.

In order to determine the appropriate angle of displacement for the two transducers 46 and 48 within the housing 20, the wavelength relationship of the servo information to the data must be considered, as well as the widths of the tracks defined in the magnetic medium 22. In order to have a complete nulling of the undesired signals, so that a properly oriented transducer 46 or 48 will detect only one of either the servo information or the data, the azimuthal misalignment between the data and information signals on the medium 22 must be such that one full wavelength of one of the signals is underneath the gap of the selected transducer at a given time.

The procedure for determining the appropriate angle of displacement of the two transducers 46 and 48 is defined below by use of one exemplary situation. The calculations in this example situation are based on the assumption that the magnetic medium 22 comprises two layers of magnetic material having different levels of coercivity It will be assumed that the servo information density is approximately one-fourth as great as the data density, as is illustrated in the relationship between the waveforms 3a and 3d in FIG. 3. This relationship defines the longest wavelength component that will be used in determining the angle of displacement. The possibilities for the azimuthal misalignment are, therefore, equal to the arc tangent of the integral multiples of the recording density divided by the track width of the transducer that is reading or writing the information (the read transducer). This is mathematically defined as follows:

$$\text{Azimuthal Misalignment} = \text{Tan}^{-1}(N[2/\text{ftpi}]/TW) \quad (1)$$

Where
N = an integer
ftpi = flux transitions per inch
TW = track width of the read transducer For purposes of example, it is assumed that the track width is equal to 1.2 mils, with a recording density of 5,000 flux transitions per inch. In this example, the 1.2 mil track width taken over the 200 microinch wavelength of the servo information yields an angle which is the arc tangent of $N \times 6$. As N becomes larger due to the interference created by multiple wavelengths of the data beneath the servo transducer, or by multiple wavelengths of the servo information under the data transducer, the actual precision of the angle becomes less and less critical. It is, therefore, more beneficial to use a larger azimuthal misalignment of the servo transducer 46 with respect to the data transducer 48.

The apparatus and method described above describe a means whereby servo information and data may be directly written onto or read from the magnetic medium 22 without the necessity of using filters or other devices, procedures or techniques to accomplish the segregation of this data and information.

By reference to FIG. 5, it is seen that the housing 20 is positioned adjacent the surface of the magnetic medium 22 so that the servo transducer 46 is positioned over a boundary 40 between servo tracks 30 and 32, with the data transducer 48 oriented in tandem to the servo transducer 46, so as to read and/or write data in the appropriate data track 38.

Figure 6:
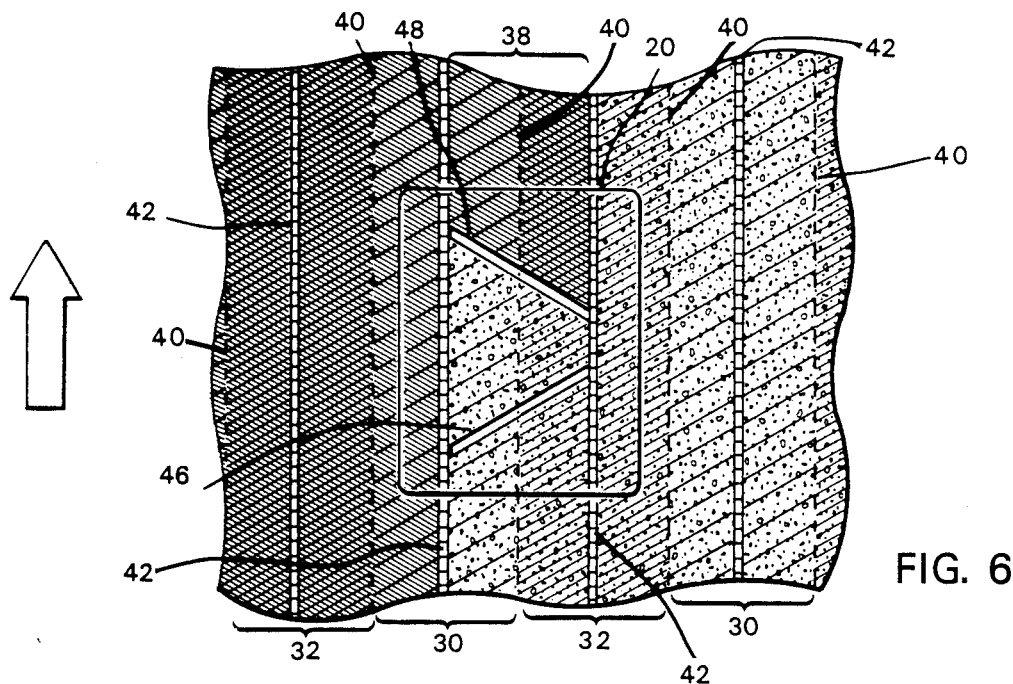
FIG. 6 is a top plan view of the system of FIG. 2, with the magnetic pattern recorded in the layers of the magnetic medium superimposed to illustrate the relationship between the servo and data information, as it relates to the tracking of the transducers on the magnetic medium.

The relationship between the servo tracks 30 and 32 and the data tracks 38 with respect to the housing 20 and the two transducers 46 and 48 can best be seen by reference to FIG. 6. FIG. 6 comprises a transducer's or top plan view of the system comprising applicants' invention. Specifically, the adjacent first and second frequency servo tracks 30 and 32, respectively, are seen in their underlying relationship to the data tracks 38, which lie partially across each of those servo tracks 30 and 32. The guard bands 42 are shown separating adjacent data tracks 38 to prevent interference between those data tracks.

The orientation of the two transducers 46 and 48 in the housing 20 and with respect to the servo and data tracks 30, 32 and 38 is also illustrated. In particular, it is noted that the servo transducer 46 is preferably positioned with its center directly over the boundary 40 between adjacent servo tracks 30 and 32. The length of transducer 46 is not critical, and it can be shorter or longer than the width of data track 38. The length of the data transducer 48 should not be such that data is written by that transducer into the guard band 42 or beyond that band into adjacent data tracks Preferably, the data transducer 48 is of a length that permits reading and writing across the full width of the data track 38 in order to maximize the lateral placement of data across the magnetic medium 22. However, the data transducer 48 may be of a length that does not extend across the full data track 38 if this is desired.

The lateral position of the housing 20 with respect to the magnetic medium is determined by the servo transducer 46. Specifically, the servo transducer 46 reads the servo information from the adjacent servo tracks 30 and 32, and provides the information to a system that is described hereafter, and which ascertains the individual amplitudes of the servo information in each of the adjacent tracks 30 and 32. The composite amplitude of this servo information defines an error signal that is used for inducing a head mover device to adjust the lateral position of housing 20, in order to center the servo transducer 46 over the appropriate boundary 40.

One preferred apparatus and method for accomplishing this lateral positioning of the housing 20 may be described by reference to FIG. 7. The system of FIG. 7 uses frequency discrimination in separating the higher and lower frequency servo information from the first and second frequency servo tracks 30 and 32. In order to accomplish this, the system receives a signal from a head 60, which comprises the servo transducer 46. The signal from the head 60 comprises the information stored on the servo tracks 30 and 32 in the magnetic medium 22, as read from those tracks by the head 60. The signal is passed from the head 60 to an amplifier 62, whose band pass is sufficiently broad to permit the passage of both the higher and the lower servo frequencies at their primary data rates.

For purposes of example, if it is assumed that the speed of the magnetic medium 22 adjacent the head 60 is 120 inches per second, and if it is assumed that the lower and higher frequency servo densities are, respectively, 2,500 ftpi and 5,000 ftpi, then the multiplication product of the tape speed and the servo densities indicate a signal frequency of 300 Khz in the first frequency servo track 30, and a servo frequency of 600 Khz in the second frequency servo track 32. Accordingly, for this example, the amplifier 62 must have a band pass range with a lower limit which is at or less than 300 Khz response, and an upper limit of at least 600 Khz response.

The output of the amplifier 62 passes to a low frequency servo decoding filter 64, which has a center frequency of about 300 Khz and a roll-off of 6 DB per octave. The signal from the filter 64 is passed to a conventional AM discriminator 66, such as a peak detector circuit or a simple RC network with AM discriminators such as a diode array. Such discriminators are well-known by those who are skilled in the technology.

The output from the amplifier 62 is also passed to a high frequency servo decoding filter 68, which has a center frequency of 600 Khz and a roll-off of 6 DB per octave. The output from the high frequency filter 68 is passed to an AM discriminator 70, which is substantially identical to the AM discriminator 66.

The signals from the two AM discriminators 66 and 70 are each passed to input terminals of a differential amplifier, which comprises a comparator 72. The comparator 72 produces an output signal that is proportional to the voltage difference between the signals received from the two amplitude discriminators 66 and 70. This output signal from the comparator 72 is provided to a head mover 74, which comprises a head positioning mechanism for controlling the lateral position of the housing 20, and thereby the transducers 46 and 48 with respect to the magnetic medium 22.

The head mover 74 produces a physical position offset whose distance is equivalent to the amplitude of the signal it receives from the comparator 72, with the direction of movement determined by the polarity of the voltage from the comparator 72. Head positioning mechanisms capable of accomplishing the purposes of the head mover 74 are well-known in the magnetic storage technology. Typical head movers which could be adapted for use in the present invention are, for example, described in U.S. Pat. No. 4,439,699 to Brende et al.; U.S. Pat. No. 4,456,934 to Wedman et al; and U.S. Pat. No. 4,609,959 to Rudi Each of the above-identified patents are hereby incorporated herein by reference.

Figure 7:
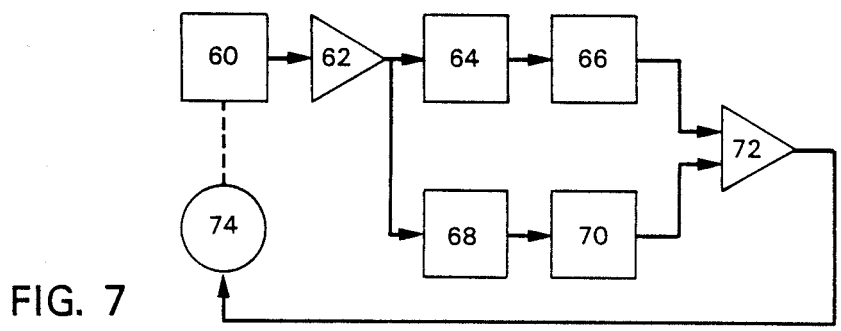
FIG. 7 is a block diagram illustrating the components of a system for controlling the lateral position of the transducers with respect to the magnetic medium.

In operation, the system of FIG. 7 functions to accurately align the transducers 46 and 48 within a desired data track 38. The system utilizes a technique that attempts to maintain the position of the servo transducer 46 over the boundary 40 between two adjacent servo tracks 30 and 32. Accordingly, as the transducer 46 becomes laterally misaligned with respect to the underlying servo tracks 30 and 32, the signal amplitude from one of the tracks will be greater than the signal amplitude from the other track.

For example, if the transducer 46 begins moving toward the first servo track 30 and away from the second servo track 32, the lower frequency servo information signal received through the amplifier 62 from the first servo track 30 will increase in amplitude, while the higher frequency servo information signal received through the amplifier 62 from the second servo track 32 will decrease in amplitude. After processing these signals through the low and the high frequency filters 64 and 68, and through the two AM discriminators 66 and 70, the comparator 72 will produce an output signal whose voltage is negative and proportional to the difference in amplitude of the two signals. If the servo transducer 46 had traveled in the other direction, toward the second servo track 32 and away from the first servo track 30, the comparator 72 would produce an output signals whose voltage is positive and proportional to the difference in amplitude of the two signals.

The information from the comparator 72 is used by the head mover 74 to determine the direction and amount of lateral displacement of the housing 20 in order to accurately reposition the servo transducer 46. Of course, with the data transducer 48 also secured to the housing 20, the accurate alignment of the servo transducer 46 over the two adjacent servo tracks 30 and 32 will produce the accurate positioning of the data transducer 48 over the desired data track 38.

The feedback configuration of the system of FIG. 7 will cause the head mover 74 to continue adjusting the position of the servo transducer 46 until the signals in the comparator 72 cancel each other, producing a null output signal from that comparator. In that situation, the servo transducer 46 is properly positioned, and the head mover 74 will not change the position of the transducer 46.

Figure 8:
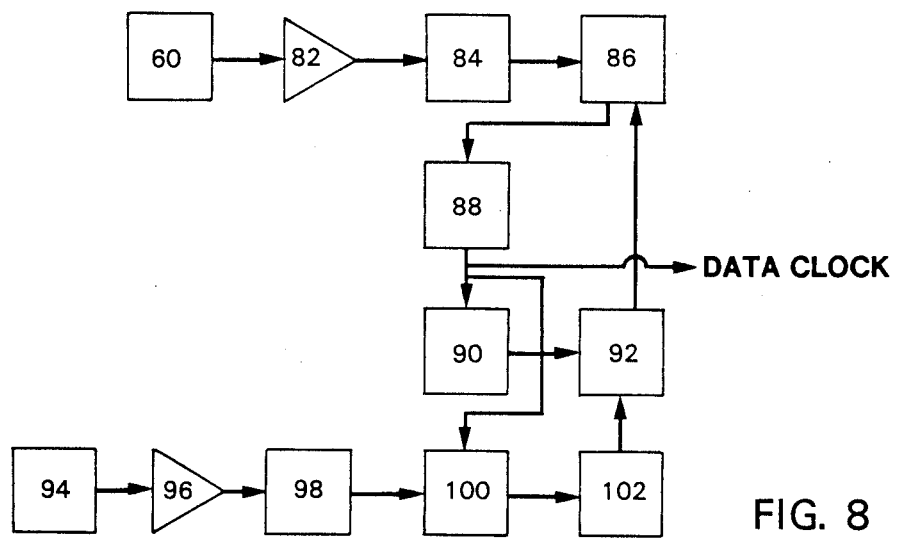
FIG. 8 is a block diagram illustrating the components of a system for generating clocking data and for controlling the linear density of data in the data layer of the magnetic medium.

Referring now to FIG. 8, the system and method for substantially overcoming the influences of magnetic medium speed variation may be described. In order to minimize the negative effects of speed variations in the magnetic medium due to conditions such as motor fluctuation, tape non-rigidity, and lack of speed control, the system of FIG. 8 functions to synchronize the data clock rate to the media speed, thereby suppressing any adverse effects of media speed variations. More specifically, the technique for minimizing this speed variation comprises, in one preferred embodiment, using the higher frequency component of the servo information in a phase lock loop circuit, along with a signal from a frequency multiplier that is running at the primary data rate for the data. This frequency multiplier is then used as the data clock for the purpose of writing the data onto the magnetic medium, as well as for establishing the center of the bit cell transition region on the returning data signal. A synchronization character is used prior to the beginning of each data block for synchronizing the servo and data information. Once the synchronization character has been encountered, the data tracking phase lock loop is locked, the phase is synchronized to the servo information, and all clock recovery and writing operations are then done in synchronism to this clock.

In order to properly operate the system of FIG. 8, the frequencies of the servo information are chosen in one preferred embodiment to be 50% and 25% of the data frequencies, so that the servo frequencies may be used for clock regeneration and for reading and writing of the data. These frequency relationships become apparent by reference to the frequency waveforms illustrated in FIG. 4. Although such frequency relationships are desirable, they are not necessary for proper operation of the system. As was indicated previously, for purposes of example, the high frequency servo signal in the second servo track 32, which is tracked by the system of FIG. 8, is selected to be 600 Khz at a magnetic medium speed of 120 inches per second.

More particularly, the system of FIG. 8 includes the first head 60, which includes the transducer 46, for reading the servo information from the two adjacent servo tracks 30 and 32. The head 60 is connected through a servo amplifier 82 to a filter 84 having a 600 Khz center frequency, with 6 DB or greater per octave roll-off. The output from the filter 84 is connected to a phase discriminator 86 wherein the phase of the servo information signal from the head 80 is compared with an adjusted phase of the data signal detected from the data tracks 38. The means for providing this adjusted phase of the data signal is described hereafter.

The phase discriminator 86 produces an output signal comprising a voltage representing the phase difference or phase error between the servo signal phase and the adjusted phase of the data clock. This phase error signal is provided to a voltage controlled oscillator 88, initially set to run at a frequency of 1.2 Mhz which is twice the 600 Khz tracking frequency. The actual output frequency of the voltage controlled oscillator 88 will depend upon the phase error signal received from the phase discriminator 86. The output of oscillator 88 is provided to a frequency divider 90, which down divides the signal from the oscillator 88 to 600 Khz. The signal from the divider 90 is transmitted to a phase adjusting network 92, which places a delay or advance in the phase of the signal from the divider 90, based upon the phase difference between a data signal and the servo signal where, for example, a data clock output signal is also communicated from the voltage controlled oscillator 88 for use in clocking operations of the system.

The data signal is detected from a selected data track 38 through a second head 94, which comprises the data transducer 48. The data signal detected by the second head 94 is transmitted through an amplifier 96 to a filter 98 whose center frequency is 1.2 Mhz for data filtration. The output of the filter 98 is connected to a phase comparator 100, which is also connected to receive the output of the voltage controlled oscillator 88. The output of the phase comparator 100 is provided to a sample and hold circuit 102, the output of which is connected to an input of the phase adjusting network 92. In operation, the system is synchronized at the beginning of each data block by reference to a constant data frequency synchronization character, which is included at the beginning of each data block in the data track 38 of the magnetic medium 22. This synchronization character is usually comprised of a string of 30 to 60 logical one's. This synchronization character is detected through the second head 94, and is transmitted via the amplifier 96 and the filter 98 to the phase comparator 100. The phase comparator 100 compares the synchronization data signal with the output of the variable controlled oscillator 88, and provides a difference signal to the sample and hold circuit 102.

If the phase comparator 100 determines that the phase of the data signal is leading the phase of the servo signal by a given amount such as, for example, 15 degrees, then a positive 15 degree value is recorded in the sample and hold circuit 102. Conversely, if the data signal were found to be lagging the servo signal by an amount, such as 15 degrees, then the phase comparator 100 would place a negative 15 degree value in the sample and hold circuit 102. This leading or lagging phase difference value is communicated from the sample and hold circuit to the phase adjusting network 92. The phase adjusting network 92 adjusts the phase of the signal received from the divider 90 by the amount received from the sample and hold circuit 102, and in the leading direction if the value from the sample and hold circuit 102 is positive, or the lagging direction if the value from the sample and hold circuit 102 is negative. This adjusted signal is then provided to the phase discriminator 86, where it is compared with the servo signal to produce the phase difference signal described above.

At the end of the synchronization character, the value stored in the sample and hold circuit 102 is fixed, and the phase correction produced in the phase adjusting network 92 is then maintained throughout the entire data block. A data block is typically on the order of 8 Kbytes to 1.2 Mbytes in length, which is approximately equivalent to 10 to 40 inches of magnetic tape length. Accordingly, the phase must remain completely synchronized between the servo and data signals for as much as 20 seconds at a magnetic tape speed of 120 inches per second. It is assumed that the mechanical variations or other causes for speed changes will be sufficiently small during this period of time that the phase locked loop configuration of FIG. 8 will maintain synchronization until the beginning of the next data block, at which time another synchronization character is generated and the lead or lag value from the sample and hold circuit 102 is changed in the manner described above.

With the systems described herein, phase synchronization is not required during a writing operation. Therefore, the write clock is directly driven from the voltage controlled oscillator 88 during the writing operation. Synchronization is required during a read recovery operation, and in this situation, the read data clock is generated directly from the output of the voltage controlled oscillator 88 after the synchronization has occurred. The generation of clock signals in this manner greatly reduces and simplifies the accurate handling of magnetically stored data, and provides a system and method whereby data loss and undesirable operating conditions due to speed variations can be minimized in a straight-forward and simple manner.

In contrast, it will be appreciated that the typical conventional tape and disk applications require that the data coding itself maintain clock synchronization, since the data is impressed into the code as a time period variation. It is required, therefore, that additional transitions be inserted into the code at such a point where phase lock loop synchronization cannot be maintained due to the pseudo-frequency modulation of the coding. These additional insertions reduce the amount of data storage capacity that is available, often to a significant degree.

Typical codes which require clocking include the well-known group code recording (GCR) and modified frequency modulation (MFM), the latter of which is frequently used on floppy disk applications. In such applications using MFM, 1 flux transition per data bit being stored is required regardless of the polarity of the data bit. This requirement consumes a relatively large amount of data storage area in the data track 38 of the magnetic medium 22. The means by which clocking signals are derived and synchronization is accomplished in the present invention greatly improve the efficiencies, and thus the data storage space availability as compared to codes such as those described above.

Not only does the invention described herein comprise a significant improvement over the prior art in providing a system for achieving high track densities, but it also overcomes other long-existent problems in the industry by (1) providing a means for reading the servo information with substantially no interference from the data, and likewise for reading and/or writing data with substantially no interference from the servo information; (2) providing a synchronization system and method for minimizing the effects of speed variations in the magnetic medium due to factors such as motor fluctuation, tape non-rigidity, and lack of speed control; and (3) providing a non-self clocking code for generating a higher bit per inch efficiency, with a flux transition density which is not generally possible through use of a self-clocking code on a magnetic medium such as a tape.

The invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes that come within the meaning and range of equivalency of the claims are to be embraced with their scope.

What is claimed and desired to be secured by United States Letters Patent is:

1. A magnetic recorder for reading and writing signals onto at least one track of a magnetic medium, wherein said magnetic medium has a servo signal recorded in a first level of the magnetic medium at a first angle with respect to the direction of travel of the magnetic medium, comprising:
   a first transducer having a gap configured on the transducer substantially at said first angle with respect to the direction of travel of the magnetic medium such that the servo signal may be read by said first transducer;
   a second transducer having a gap configured on the transducer at a second angle with respect to the direction of travel of the magnetic medium,
      said second angle being sufficiently different from the first angle such that the second transducer reads or writes a data signal on said at least one track of the magnetic medium so that the data signal is detectable by the second transducer substantially independently from the servo signal;
   said first angle being sufficiently different from the second angle such that the servo signal is detectable by the first transducer substantially independently form the data signal and wherein
   the first and second angles define an azimuthal misalignment between the first and second transducer gap orientations, the azimuthal misalignment being formed so that:

$$\text{Tan}^{-1}(N[2/\text{ftpi}]/\text{TW}),$$

where
   N is an integer,
   ftpi is flux transitions per inch, and
   TW is track width of one of said transducers; and
   means electrically connected to the first transducer and responsive to the servo signal read by the said first transducer for providing a position signal for use in controlling the position of the second transducer with respect to the magnetic medium.

2. A magnetic recorder as defined in claim 1, further comprising means for controlling the position of the second transducer with respect to the magnetic medium in response to the position signal.

3. A magnetic recorder as defined in claim 2, wherein the means for controlling the position comprises an actuator which is coupled to the first transducer so as to control the position of the first transducer on the magnetic medium, and wherein the second transducer is secured in cooperation with the first transducer such that the position of the second transducer on the magnetic medium is determined by position of the first transducer on said magnetic medium.

4. A magnetic recorder as defined in claim 1, further comprising a housing for securing the first and second transducers in a fixed physical relationship with respect to each other.

5. A magnetic recorder as defined in claim 4, wherein the housing secures the first and second transducers in tandem configuration with respect to the direction of travel of said at least one track.

6. A magnetic recorder as defined in claim 1, further comprising a plurality of servo signals recorded in parallel alignment and at the first angle in the first level of the magnetic medium, each said servo signal defining one of a corresponding plurality of parallel servo tracks, with alternate ones of said servo signals being at separate frequencies.

7. A magnetic recorder as defined in claim 6, wherein:
   the first transducer reads at least a portion of each of a pair of adjacent servo signals; and
   wherein the means for providing a position signal comprises circuitry for separating and comparing said portions of said pair of adjacent servo signals to develop the position signal.

8. A magnetic recorder as defined in claim 1, wherein the second transducer reads or writes a data signal in a second level of the magnetic medium and along said at least one track of the magnetic medium.

9. A magnetic recorder as defined in claim 8, wherein the first level of the magnetic medium comprises a region having a first level of coercivity for storing servo signals, and wherein the second level of the magnetic medium comprises a region having a second level of coercivity for storing data signals, said second level of coercivity being sufficiently different from said first level of coercivity that the data signals may be read or written by the second transducer with substantially no change to the servo signals stored in said first level of the magnetic medium.

10. A magnetic recorder as defined in claim 9, wherein the magnetic medium comprises magnetic tape.

11. A method for reading and writing signals onto at least one track of a magnetic medium, wherein the magnetic medium has a servo signal recorded in a first level of the magnetic medium at a first angle with respect to direction of travel of the magnetic medium, the method comprising:
   reading the servo signal by means of a first transducer having a gap configured on the first transducer at said first angle with respect to the direction of travel of the magnetic medium;
   performing at any given time not more than one of the functions comprising reading and writing a data signal on said at least one track of the magnetic medium by means of a second transducer having a gap configured on the second transducer at a second angle with respect to the direction of travel of the magnetic medium, said second angle being sufficiently different from the first angle that the data signal is substantially independently detectable by the second transducer from the servo signal;

synchronizing the reading of the servo and data signals in response to a synchronization signal detected by the second transducer, with respect to the servo signal read by the first transducer by comparing a phase of the servo signal read by the first transducer with a phase of a synchronization character read by the second transducer;

providing a phase correction to an output of one of said first and second transducers to synchronize the phase of the servo and data signals for a period of time; and controlling a lateral position of the second transducer on the magnetic medium in response to the servo signal read by the first transducer.

12. A method as defined in claim 11, wherein the first and second transducers are secured in a fixed physical relationship with respect to each other.

13. A method as defined in claim 11, wherein the magnetic medium has a plurality of servo signals recorded in parallel alignment and at the first angle in the first level of the magnetic medium, each said servo signal defining one of a corresponding plurality of parallel servo tracks, with alternate ones of said servo signals being at separate frequencies, and wherein the method further comprises:

reading at least a portion of each of a pair of adjacent servo signals by means of the first transducer;

separating and comparing said portions of said pair of adjacent servo signals; and providing a position signal in response to said comparison, said position signal being used in the step of controlling the lateral position of the second transducer.

14. A method as defined in claim 11, wherein the second transducer reads and writes a data signal in a second level of the magnetic medium and along said at least one track of the magnetic medium.

15. A magnetic recorder for reading and writing signals onto at least one track of a magnetic medium wherein said magnetic medium has a servo signal recorded in a first level of the magnetic medium at a first angle with respect to the direction of travel of the magnetic medium comprising:

a first transducer having a gap configured on the transducer substantially at said first angle with respect to the direction of travel of the magnetic medium such that the servo signal may be read by said first transducer;

a second transducer having a gap configured on the transducer at a second angle with respect to the direction of travel of the magnetic medium, said second angle being sufficiently different from the first angle such that the second transducer reads or writes a data signal on said at least one track of the magnetic medium so that the data signal is detectable by the second transducer substantially independently from the servo signal;

means electrically connected to the first transducer and responsive to the servo signal read by the said first transducer for providing a position signal for use in controlling the position of the second transducer for reading and writing a data signal with respect to the magnetic medium; and means responsive to signals from the first and second transducers for synchronizing reading of the servo signals and the data signals by said first and second transducers which comprises circuitry for comparing a phase of a servo signal read by the first transducer with a phase of a data signal read by the second transducer and for providing a phase correction to an output of one of said first and second transducers to synchronize the phase of the servo and data signals for a period of time.

16. A magnetic recorder as defined in claim 15, wherein the circuitry for comparing phase comprises a phase locked loop for maintaining phase of the servo and data signals for said period of time.

17. A magnetic recorder as defined in claim 15, wherein a frequency synchronization character is included in the magnetic medium at the beginning of a data block, and wherein the circuitry for comparing phase compares a phase of the servo signal with a phase of the frequency synchronization character to provide a phase difference signal which comprises a reference for maintaining phase of the servo and data signals for said period of time.

18. A magnetic recorder as defined in claim 17, wherein the period of time comprises the time period during which said data block passes adjacent the second transducer.

19. A magnetic recorder as defined in claim 15, wherein the means for synchronizing reading comprises:

a phase discriminator electrically connected to the first transducer and responsive to a reference signal comprising an adjusted phase of the data signal for providing an output signal representing phase difference between the phase of the servo signal and the adjusted phase of the data signal;

an oscillator, responsive to the output signal for applying an oscillation signal at a selected frequency to the output signal, and thereby providing an oscillator output signal;

a frequency divider for dividing the oscillator output signal to provide a divider output signal at another selected frequency;

a phase adjusting network for adjusting phase of the divider output signal based upon a difference signal and phase difference between the data signal and the servo signal, thereby producing said reference signal; and a phase comparator electrically connected to receive the oscillator output signal and electrically connected to the second transducer for comparing phase of the oscillator output signal and the data signal, thereby providing said difference signal representing phase of the servo signal with respect to the data signal.

20. A magnetic recorder as defined in claim 19, further comprising a sample and hold circuit connected to receive and store the difference signal.

21. A magnetic recorder as defined in claim 19, wherein the oscillator output signal comprises a data clock signal for clocking selected operations of the system.

22. A magnetic recorder as defined in claim 19, wherein a frequency synchronization character is included in the magnetic medium at the beginning of a data block, and wherein the data signal comprises said synchronization character.

23. A magnetic recorder as defined in claim 15, including means for controlling the position comprising an actuator which is coupled to the first transducer so as to control the position of the first transducer on the magnetic medium, and wherein the second transducer is secured in cooperation with the first transducer such that the position of the second transducer on the magnetic medium is determined by the position of the first transducer on said magnetic medium.

24. A magnetic recorder as defined in claim 15, further comprising a housing for securing the first and second transducers in a fixed physical relationship with respect to each other.

25. A magnetic recorder as defined in claim 24, wherein the housing secures the first and second transducers in tandem configuration with respect to the direction of travel of said at least one track.

26. A magnetic recorder as defined in claim 15, further comprising a plurality of servo signals recorded in parallel alignment and at the first angle in the first level of the magnetic medium, each said servo signal defining one of a corresponding plurality of parallel servo tracks, with alternate ones of said servo signals being at separate frequencies.

27. A magnetic recorder as defined in claim 26, wherein:
the first transducer reads at least a portion of each of a pair of adjacent servo signals; and
wherein the means for providing a position signal comprises circuitry for separating and comparing said portions of said pair of adjacent servo signals to develop the position signal.

28. A magnetic recorder as defined in claim 15, wherein the first angle is sufficiently different from the second angle such that the servo signal is detectable by the first transducer substantially independently from the data signal.

29. A magnetic recorder as defined in claim 28, wherein the first and second angles define an azimuthal misalignment between the first and second transducer gap orientations such that substantially one full wavelength of one of said data or servo signals is underneath the gap of its corresponding data or servo transducer at a given time.

30. A magnetic recorder as defined in claim 29, wherein the azimuthal misalignment is formed so that:

$$\mathrm{Tan}^{-1}(N[2/\mathrm{ftpi}]/TW),$$

where
N is an integer,
ftpi is flux transitions per inch, and
TW is track width of one of said transducers.

31. A magnetic recorder as defined in claim 15, wherein the second transducer reads or writes a data signal in a second level of the magnetic medium and along said at least one track of the magnetic medium.

32. A magnetic recorder as defined in claim 31, wherein the first level of the magnetic medium comprises a region having a first level of coercivity for storing servo signals, and wherein the second level of the magnetic medium comprises a region having a second level of coercivity for storing data signals, said second level of coercivity being sufficiently different from said first level of coercivity that the data signals may be read or written by the second transducer with substantially no change to the servo signals stored in said first level of the magnetic medium.

33. A magnetic recorder as defined in claim 32, wherein the magnetic medium comprises magnetic tape.

34. A method for reading and writing signals onto at least one track of a magnetic medium, wherein the magnetic medium has a servo signal recorded in a first level of the magnetic medium at a first angle with respect to direction of travel of the magnetic medium, the method comprising:
reading the servo signal by means of a first transducer having a gap configured on the first transducer at said first angle with respect to direction of travel of the magnetic medium;
performing at any given time not more than one of the functions comprising reading and writing a data signal on said at least one track of the magnetic medium by means of a second transducer having a gap configured on the second transducer at a second angle with respect to the direction of travel of the magnetic medium, said second angle being sufficiently different from the first angle that the data signal is substantially independently detectable by the second transducer from the servo signal;
synchronizing the reading of the servo and data signals in response to a synchronization signal detected by the second transducer, with respect to the servo signal read by the first transducer by providing an output signal representing a phase difference between a phase of the servo signal and a reference signal which comprises an adjusted phase of the data signal;
applying an oscillation signal at a selected frequency to the output signal to provide an oscillator output signal;
dividing the oscillator output signal to provide a divider output signal at another selected frequency;
adjusting the phase of the divider output signal based upon a difference signal and a phase difference between the data signal and the servo signal, thereby producing said reference signal;
comparing the phase of the oscillator output signal and the data signal to provide said difference signal representing phase of the servo signal with respect to the data signal; and
using the oscillator output signal as a clocking signal for clocking reading of the servo and data signals; and
controlling a lateral position of the second transducer on the magnetic medium in response to the servo signal read by the first transducer.

35. A method as defined in claim 34, wherein a frequency synchronization character is included in the magnetic medium at the beginning of the data block, and wherein the data signal comprises said synchronization character.

36. A method as defined in claim 34, wherein the first and second transducers are secured in a fixed physical relationship with respect to each other.

37. A method as defined in claim 34, wherein the magnetic medium has a plurality of servo signals recorded in parallel alignment and at the first angle in the first level of the magnetic medium, each said servo signal defining one of a corresponding plurality of parallel servo tracks, with alternate ones of said servo signals being at separate frequencies, and wherein the method further comprises:

reading at least a portion of each of a pair of adjacent servo signals by means of the first transducer;

separating and comparing said portions of said pair of adjacent servo signals; and providing a position signal in response to said comparison, said position signal being used in the step of controlling lateral position of the second transducer.

38. A method as defined in claim 34, wherein the second transducer reads and writes a data signal in a second level of the magnetic medium and along said at least one track of the magnetic medium.

* * * * *